(12) United States Patent
Kwiatkowski et al.

(10) Patent No.: US 11,530,760 B2
(45) Date of Patent: Dec. 20, 2022

(54) HYDRAULIC CARTRIDGE VALVE WITH ACTIVATION SENSOR

(71) Applicant: DEERE & COMPANY, Moline, IL (US)

(72) Inventors: Adam H. Kwiatkowski, Dubuque, IA (US); Daniel J. Wallace, Iowa City, IA (US)

(73) Assignee: DEERE & COMPANY, Moline, IL (US)

( * ) Notice: Subject to any disclaimer, the term of this patent is extended or adjusted under 35 U.S.C. 154(b) by 41 days.

(21) Appl. No.: 16/983,350

(22) Filed: Aug. 3, 2020

(65) Prior Publication Data

US 2022/0034423 A1 Feb. 3, 2022

(51) Int. Cl.
  *F16K 37/00* (2006.01)
  *F16K 15/06* (2006.01)
  *F16K 27/02* (2006.01)

(52) U.S. Cl.
  CPC ........ *F16K 37/0041* (2013.01); *F16K 15/063* (2013.01); *F16K 27/02* (2013.01)

(58) Field of Classification Search
  CPC ..... F16K 37/0041; F16K 15/063; F16K 27/02
  See application file for complete search history.

(56) References Cited

U.S. PATENT DOCUMENTS 5,070,707 A * 12/1991 Ni .......................... F25B 47/022
                                                            62/234
5,143,118 A *  9/1992 Sule .................... F16K 31/0675
                                                            137/554
7,886,767 B2    2/2011 Tschida et al.
2002/0020460 A1* 2/2002 Viken ................ F01M 11/0458
                                                            141/59
2019/0085875 A1 3/2019 Slama et al.

FOREIGN PATENT DOCUMENTS

| CN | 201787168 U | 4/2011 |
| DE | 3210554 A1 | 10/1983 |
| DE | 102009012632 A1 | 9/2010 |
| DE | 102014103507 A1 | 9/2015 |
| EP | 1980777 A2 | 10/2008 |
| JP | 2017150934 A | 8/2017 |

OTHER PUBLICATIONS

German Search Report issued in application No. DE102021116752.3 dated May 6, 2022 (06 pages).

* cited by examiner

*Primary Examiner* — Angelisa L. Hicks
(74) *Attorney, Agent, or Firm* — Taft Stettinius & Hollister LLP; Stephen F. Rost

(57) ABSTRACT

A hydraulic cartridge valve including a housing with an interior, first and second ports that pass through the housing, a poppet in the housing interior, and an activation sensor. The poppet moves between a closed position that blocks flow through the housing interior between the first and second ports, and an open position that allows flow through the housing interior between the first and second ports. The activation sensor senses poppet position, and generate a valve open signal when the poppet is in the open position. The activation sensor can be a contact or contactless sensor, and can be located in an opening through the housing blocked by a diaphragm. A pushrod pushed by the poppet can activate the sensor, such that when the poppet blocks flow the pushrod is separated from the diaphragm, and when the poppet allows flow the pushrod is pushed towards the diaphragm.

18 Claims, 2 Drawing Sheets ated by an actuator or other hydraulic device, the operator or controller will have to wait for movement of the actuator coupled to the check valve to determine whether the check valve is open, and there may not be any indication to reliably determine whether the check valve is closed. It would be desirable to get timely and direct hydraulic cartridge valve position information which can be used by an operator, controller or other system.

SUMMARY

A hydraulic cartridge valve is disclosed that includes a housing with a housing interior, first and second ports that pass through the housing into the housing interior, a poppet and an activation sensor. The poppet is in the housing interior, and is configured to move between a closed position and an open position. In the closed position, the poppet blocks flow through the housing interior between the first port and the second port. In the open position, the poppet allows flow through the housing interior between the first port and the second port. The activation sensor is configured to sense when the poppet is in the open position and generate a valve open signal when the poppet is in the open position. The activation sensor can be a contact sensor, a contactless sensor, or other sensor type.

The hydraulic cartridge valve can also include an opening that passes through the housing into the housing interior, and a diaphragm located in the opening to prevents flow to and from the housing interior. The diaphragm has an interior side that faces towards the housing interior and an exterior side that faces away from the housing interior. The activation sensor can be located on the exterior side of the diaphragm. The activation sensor can be threaded into the opening. The activation sensor can be molded into the opening.

The hydraulic cartridge valve can also include a pushrod with a proximal end and a distal end, where the pushrod is located in the housing interior. The proximal end of the pushrod can be adjacent to the poppet, and the distal end of the pushrod can be on the interior side of the diaphragm. When the poppet is in the closed position then the distal end of the pushrod is separated from the diaphragm, and when the poppet is in the open position then the distal end of the pushrod is pushed towards the diaphragm. The distal end of the pushrod can be moveable in the opening on the interior side of the diaphragm.

The hydraulic cartridge valve can also include a spring located in the housing interior, where the spring has a spring force configured to push against a spring side of the poppet to push the poppet into the first port to block flow through the first port. The poppet can also include a port side that faces the first port, where the port side of the poppet is opposite the spring side of the poppet. When a port side force at the port side of the poppet is greater than a spring side force at the spring side of the poppet then the poppet is pushed by the port side force into the open position, and when the port side force at the port side of the poppet is not greater than the spring side force at the spring side of the poppet then the poppet is pushed by the spring side force into the closed position. The spring can be a coil spring with an interior surrounded by coils of the spring; and the pushrod can be located in the interior of the spring.

The activation sensor can be a contact sensor, such that when the poppet is in the open position then the distal end of the pushrod is pushed against the diaphragm, and the activation sensor detects contact of the distal end of the pushrod against the diaphragm.

The activation sensor can be a contactless sensor; sensor, such that when the poppet is in the open position then the activation sensor senses proximity of the distal end of the pushrod, and when the poppet is in the closed position then the activation sensor does not sense proximity of the distal end of the pushrod. The activation sensor can be a magnetic sensor that senses proximity of the distal end of the pushrod.

The housing can include an upper body and a lower body. The first port can be located in the lower body. The opening for the activation sensor can pass through the upper body of the housing into the housing interior.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein.

Corresponding reference numerals are used to indicate corresponding parts throughout the several views.

DETAILED DESCRIPTION

The embodiments of the present disclosure described below are not intended to be exhaustive or to limit the disclosure to the precise forms in the following detailed description. Rather, the embodiments are chosen and described so that others skilled in the art may appreciate and understand the principles and practices of the present disclosure.

The position of a typical hydraulic cartridge valve is often not timely available and the position information may not be not directly available from the primary source. In a typical hydraulic system using a check valve coupled to an actuator or other hydraulic device, the operator or controller has to wait for movement of the actuator coupled to the check valve to determine whether the check valve is open, and there may not be any direct indication of whether the check valve is closed.

A contact or contactless electrical activation sensor can be integrated into a hydraulic cartridge valve such that the activation sensor would detect the mechanical movement of the components within the cartridge valve. The concept is described below with reference to a pilot operated check valve (PO check valve), but this could be adopted for use in other types of hydraulic cartridge valves. The activation sensor can measure when the poppet in the PO check valve is hydraulically activated. The signal from the activation sensor can be used on a system level to provide input to software, an electrical system, or other system that can perform an action based on the activation or deactivation of the PO check valve. The hydraulic valve does not need to have an electrical coil that activates or positions the valve for the activation sensor to be integrated into the hydraulic cartridge valve.

Figure 1:
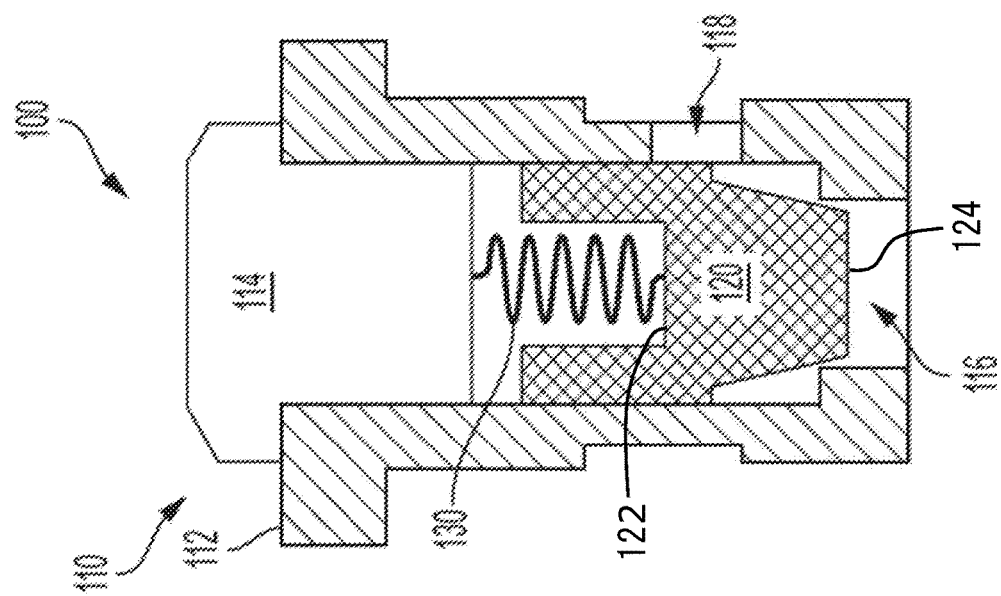
FIG. 1 illustrates an exemplary embodiment of a typical pilot operated check valve.

FIG. 1 illustrates an exemplary embodiment of a typical pilot operated check valve 100. The check valve 100 includes a housing 110, a poppet 120 and a spring 130. The housing 110 is shown to include two pieces, a body 112 and a plug 114. Alternatively, the housing 110 can be a single integrated piece or multiple pieces. The housing includes a first port 116 and a second port 118. The poppet 120 moves in the housing 110 due to opposing forces on a spring side 122 of the poppet 120 and a port side 124 of the poppet 120.

When the force at the port side 124 of the poppet 120 is less than the force at the spring side 122 of the poppet 120, then the check valve 100 is not activated (as shown). When the check valve 100 is not activated, the extended spring 130 pushes the poppet 120 into the first port 116, which blocks flow through the check valve 100. When the force at the port side 124 of the poppet 120 is greater than the force at the spring side 122 of the poppet 120, then the check valve 100 is activated. When the check valve 100 is activated, the force on the port side 124 of the poppet 120 at the first port 116 compresses the spring 130 and pushes the poppet 120 out of the first port 116, which allows flow through the check valve 100 between the first port 116 and the second port 118. In an exemplary hydraulic system using the check valve 100 where an actuator or other hydraulic device is coupled to the second port 118, an operator or controller will typically not know the status of the check valve 100 until there is movement of the actuator coupled to the second port 118.

Figure 2:
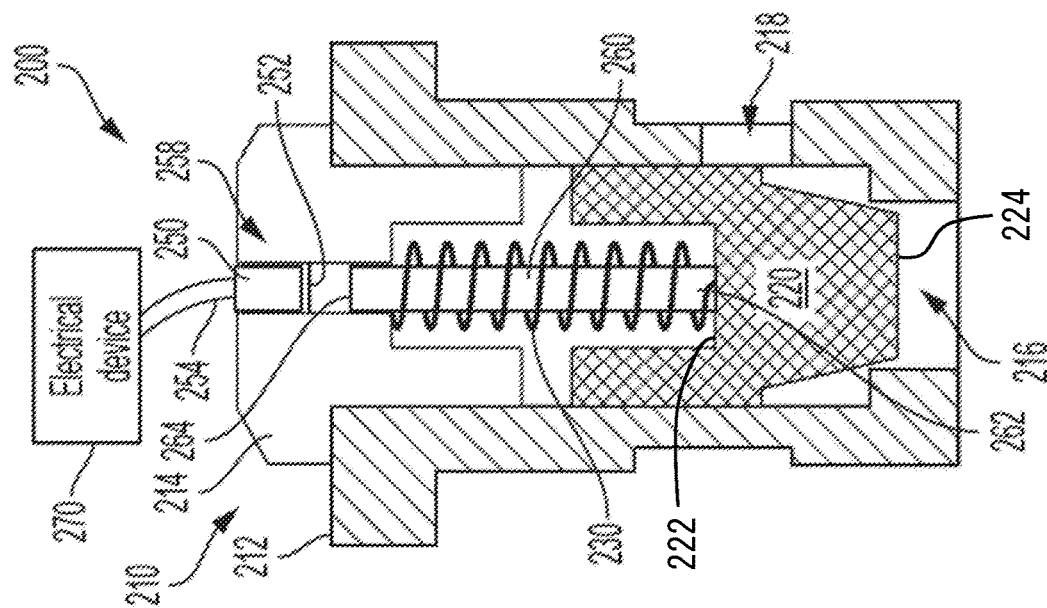
FIG. 2 illustrates an exemplary embodiment of a pilot operated check valve with an activation sensor.

FIG. 2 illustrates an exemplary embodiment of a pilot operated check valve 200 with an activation sensor. The check valve 200 includes a housing 210, a poppet 220 and a spring 230. The check valve 200 also includes an activation sensor 250, a diaphragm 252, wiring 254 and a pushrod 260. The housing 210 is shown to include two pieces, a body 212 and a plug 214. Alternatively, the housing 210 can be a single integrated piece or multiple pieces. The housing 210 includes a first port 216 and a second port 218. The housing 210 also includes an opening 258 which is shown to go through the plug 214. The poppet 220 moves in the housing 210 due to opposing forces on a spring side 222 of the poppet 220 and a port side 224 of the poppet 220.

The wiring 254 couples the activation sensor 250 to an electrical device 270. The diaphragm 252 seals the opening 258 to prevent fluid from leaking through the opening 258. The activation sensor 250 can be on an exterior side of the diaphragm 252. The activation sensor 250 could have a molded, threaded or other style connection in the opening 258 or to the housing 210. The pushrod 260 has a proximal end 262 and a distal end 264, where the distal end 264 moves in the opening 258. The pushrod 260 moves with the poppet 220 as the spring 230 compresses and extends. The spring 230 can be a coil spring with an interior surrounded by coils of the spring, and the pushrod 260 can be located in the interior of the spring 230 as shown in FIG. 2. When the poppet 220 compresses the spring 230 to allow flow between the first and second ports 216, 218, the poppet 220 also pushes the proximal end 262 of the pushrod 260 which pushes the distal end 264 of the pushrod 260 against the diaphragm 252. When the activation sensor 250 senses the distal end 264 of the pushrod 260 pushing against the diaphragm 252, the activation sensor 250 sends a valve open signal through the wiring 254 to the electrical device 270. The electrical device 270 can be, for example, a controller, an indicator or some other electrical device. For a controller, the status of the valve open signal can be a software input, or a trigger to an electrical system to perform some functions or actions. For an indicator, the presence of the valve open signal can turn on a light visible to the operator. Other functions or actions can also be taken in response to the presence or absence of the valve open signal from the activation sensor 250. In an exemplary hydraulic system using the check valve 200 where an actuator or other hydraulic device is coupled to the second port 218, the operator or controller will not have to wait for movement of the actuator coupled to the second port 218 but will know the status of the check valve 200 by the signal from the activation sensor 250.

The activation sensor 250 can be a contact sensor or a contactless sensor. For example, a contact activation sensor 250 can sense contact of the distal end 264 of the pushrod 260 against the diaphragm 252. Alternatively, a contactless activation sensor 250 can use a magnet or other contactless method to sense proximity of the distal end 264 of the pushrod 260 near the diaphragm 252.

When the force at the port side 224 of the poppet 220 is less than the force at the spring side 222 of the poppet 220, then the check valve 200 is not activated. When the check valve 200 is not activated, the extended spring 230 pushes the poppet 220 into the first port 216, which blocks flow through the check valve 200 and the pushrod 260 is not pushed against the diaphragm 252. When the force at the port side 224 of the poppet 220 is greater than the force at the spring side 222 of the poppet 220, then the check valve 200 is activated. When the check valve 200 is activated, the force on the port side 224 of the poppet 220 at the first port 216 pushes the poppet 220 out of the first port 216 which compresses the spring 230, pushes the pushrod 260 against the diaphragm 252, and allows flow through the check valve 200 between the first and second ports 216, 218.

The position of the check valve 200 is indicated by the activation sensor 250. The valve open signal is triggered as soon as the force at the port side 224 of the poppet 220 is greater than the force at the spring side 222 of the poppet 220, which pushes the poppet 220 out of the first port 216 compressing the spring 230 and pushing the distal end 264 of the pushrod 260 against the diaphragm 252. This can provide direct and more timely feedback than waiting for flow through the check valve to activate an actuator or other hydraulic device.

Figure 3:
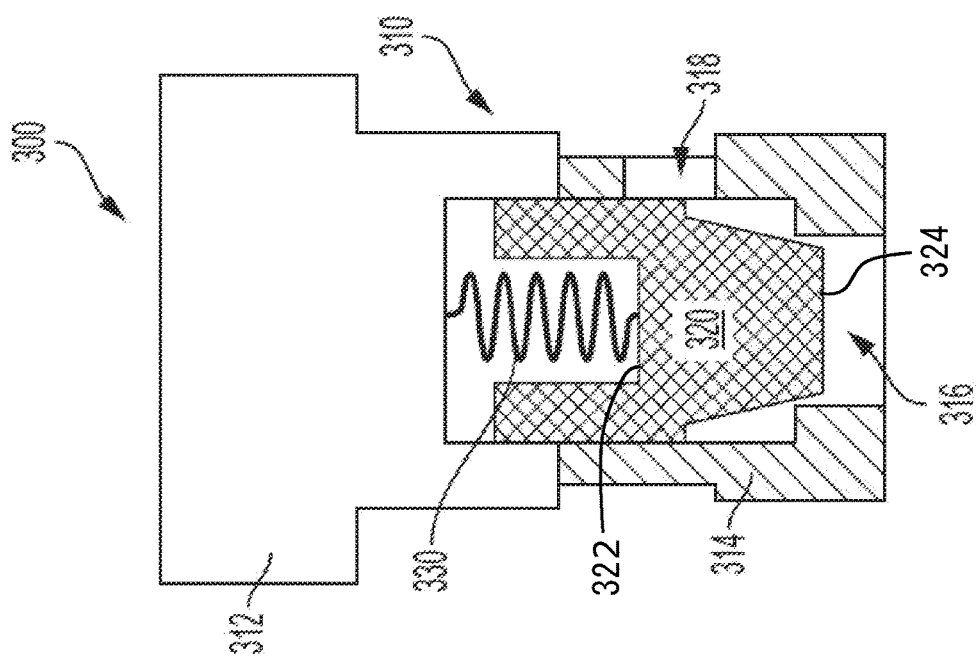
FIG. 3 illustrates another exemplary embodiment of a pilot operated check valve.

FIG. 3 illustrates another exemplary embodiment of a pilot operated check valve 300. The check valve 300 includes a housing 310, a poppet 320 and a spring 330. The housing 310 in this embodiment includes two pieces, an upper body 312 and a lower body 314. The lower body 314 includes a first port 316 and a second port 318. The poppet 320 moves in the housing 310 due to opposing forces on a spring side 322 of the poppet 320 and a port side 324 of the poppet 320.

When the force at the port side 324 of the poppet 320 is less than the force at the spring side 322 of the poppet 320, then the check valve 300 is not activated (as shown). When the check valve 300 is not activated, the extended spring 330 pushes the poppet 320 into the first port 316, which blocks flow through the check valve 300. When the force at the port side 324 of the poppet 320 is greater than the force at the spring side 322 of the poppet 320, then the check valve 300 is activated. When the check valve 300 is activated, the force on the port side 324 of the poppet 320 at the first port 316 compresses the spring 330 and pushes the poppet 320 out of the first port 316, which allows flow through the check valve 300 between the first port 316 and the second port 318. In an exemplary hydraulic system using the check valve 300 where an actuator or other hydraulic device is coupled to the second port 318, an operator or controller will typically not know the status of the check valve 300 until there is movement of the actuator coupled to the second port 318.

Figure 4:
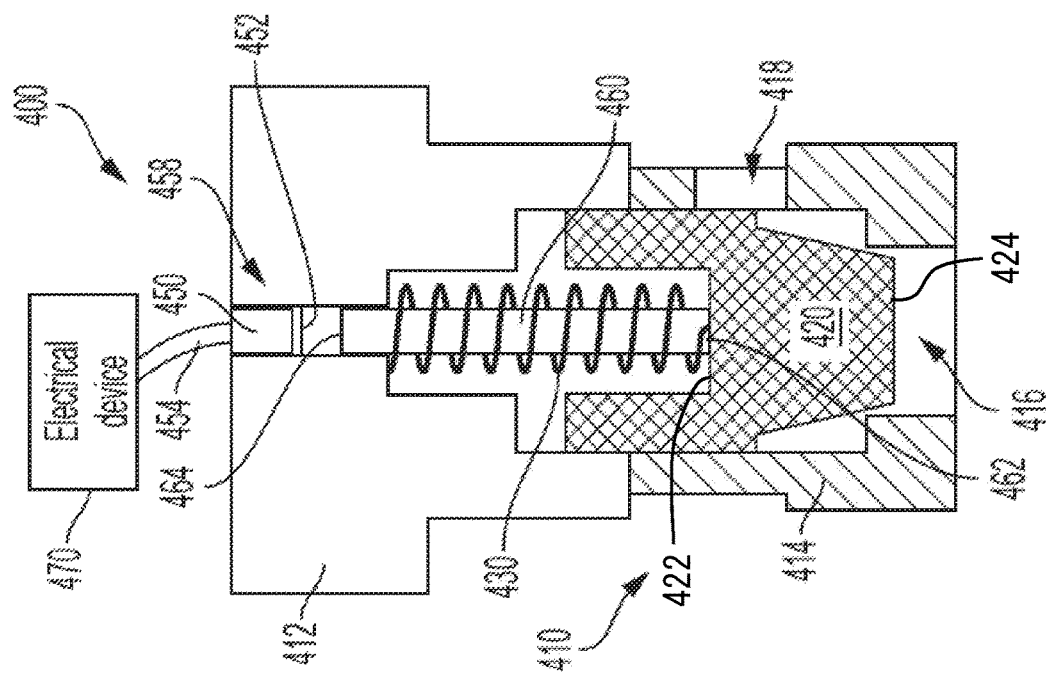
FIG. 4 illustrates another exemplary embodiment of a pilot operated check valve with an activation sensor.

FIG. 4 illustrates another exemplary embodiment of a pilot operated check valve 400 with an activation sensor. The check valve 400 includes a housing 410, a poppet 420 and a spring 430. The check valve 400 also includes an activation sensor 450, a diaphragm 452, wiring 454 and a pushrod 460. The housing 410 in this embodiment includes two pieces, an upper body 412 and a lower body 414. The housing 410 includes a first port 416 and a second port 418. The housing 410 also includes an opening 458 which is shown to go through the upper body 412. The poppet 420 moves in the housing 410 due to opposing forces on a spring side 422 of the poppet 420 and a port side 424 of the poppet 420.

The wiring 454 couples the activation sensor 450 to an electrical device 470. The diaphragm 452 seals the opening 458 to prevent fluid from leaking through the opening 458. The activation sensor 450 can be on an exterior side of the diaphragm 452. The activation sensor 450 can have a molded, threaded or other style connection in the opening 458 or to the housing 410. The pushrod 460 has a proximal end 462 and a distal end 464, and the distal end 464 moves in the opening 458. The pushrod 460 moves with the poppet 420 as the spring 430 compresses and extends. The spring 430 can be a coil spring with an interior surrounded by coils of the spring, and the pushrod 460 can be located in the interior of the spring 430 as shown in FIG. 4. When the poppet 420 compresses the spring 430 to allow flow between the first and second ports 416, 418, the poppet 420 also pushes the proximal end 462 of the pushrod 460 which pushes the distal end 464 of the pushrod 460 against the diaphragm 452. When the activation sensor 450 senses the distal end 464 of the pushrod 460 pushing against the diaphragm 452, the activation sensor 450 sends a valve open signal through the wiring 454 to the electrical device 470. The electrical device 470 can be, for example, a controller, an indicator or some other electrical device. For a controller, the status of the valve open signal can be a software input, or a trigger to an electrical system to perform some functions or actions. For an indicator, the presence of the valve open signal can turn on a light visible to the operator. Other functions or actions can also be taken in response to the presence or absence of the valve open signal from the activation sensor 450. In an exemplary hydraulic system using the check valve 400 where an actuator or other hydraulic device is coupled to the second port 418, the operator or controller will not have to wait for movement of the actuator coupled to the second port 418 but will know the status of the check valve 400 by the signal from the activation sensor 450.

The activation sensor 450 can be a contact sensor or a contactless sensor. For example, a contact activation sensor 450 can sense contact of the distal end 464 of the pushrod 460 against the diaphragm 452. Alternatively, a contactless activation sensor 450 can use a magnet or other contactless method to sense proximity of the distal end 464 of the pushrod 460 near the diaphragm 452.

When the force at the port side 424 of the poppet 420 is less than the force at the spring side 422 of the poppet 420, then the check valve 400 is not activated. When the check valve 400 is not activated, the extended spring 430 pushes the poppet 420 into the first port 416, which blocks flow through the check valve 400 and the pushrod 460 is not pushed against the diaphragm 452. When the force at the port side 424 of the poppet 420 is greater than the force at the spring side 422 of the poppet 420, then the check valve 400 is activated. When the check valve 400 is activated, the force on the port side 424 of the poppet 420 at the first port 416 pushes the poppet 420 out of the first port 416 which compresses the spring 430, pushes the pushrod 460 against the diaphragm 452, and allows flow through the check valve 400 between the first and second ports 416, 418.

The position of the check valve 400 is indicated by the activation sensor 450. The valve open signal is triggered as soon as the force at the port side 424 of the poppet 420 is greater than the force at the spring side 422 of the poppet 420, which pushes the poppet 420 out of the first port 416 compressing the spring 430 and pushing the distal end 464 of the pushrod 460 against the diaphragm 452. This can provide direct and more timely feedback than waiting for flow through the check valve to activate an actuator or other hydraulic device.

While the disclosure has been illustrated and described in detail in the drawings and foregoing description, such illustration and description is to be considered as exemplary and not restrictive in character, it being understood that illustrative embodiment(s) have been shown and described and that all changes and modifications that come within the spirit of the disclosure are desired to be protected. It will be noted that alternative embodiments of the present disclosure may not include all of the features described yet still benefit from at least some of the advantages of such features. Those of ordinary skill in the art may readily devise their own implementations that incorporate one or more of the features of the present disclosure and fall within the spirit and scope of the present invention as defined by the appended claims.

We claim:

1. A hydraulic cartridge valve comprising:
   a housing with a housing interior;
   a first port that passes through the housing into the housing interior;
   a second port that passes through the housing into the housing interior;
   a poppet in the housing interior, the poppet configured to move between a closed position and an open position, where the closed position blocks flow through the housing interior between the first port and the second port, and the open position allows flow through the housing interior between the first port and the second port;
   an activation sensor configured to sense when the poppet is in the open position and generate a valve open signal when the poppet is in the open position;
   an opening that passes through the housing into the housing interior;
   a diaphragm located in the opening that prevents flow to and from the housing interior, the diaphragm has an interior side that faces towards the housing interior and an exterior side that faces away from the housing interior; and
   a pushrod with a proximal end and a distal end, the pushrod located in the housing interior, the proximal end of the pushrod adjacent to the poppet and the distal end of the pushrod on the interior side of the diaphragm;

wherein when the poppet is in the closed position then the distal end of the pushrod is separated from the diaphragm, and when the poppet is in the open position then the distal end of the pushrod is pushed towards the diaphragm.

2. The hydraulic cartridge valve of claim 1, wherein the activation sensor is a contact sensor.

3. The hydraulic cartridge valve of claim 1, wherein the activation sensor is a contactless sensor.

4. The hydraulic cartridge valve of claim 1, further comprising
wherein the activation sensor is located on the exterior side of the diaphragm.

5. The hydraulic cartridge valve of claim 1, wherein the activation sensor is threaded into the opening.

6. The hydraulic cartridge valve of claim 1, wherein the activation sensor is molded into the opening.

7. The hydraulic cartridge valve of claim 1, further comprising a spring located in the housing interior, where the spring has a spring force configured to push against a spring side of the poppet to push the poppet into the first port to block flow through the first port;

wherein the poppet also includes a port side that faces the first port, where the port side of the poppet is opposite the spring side of the poppet; and wherein when a port side force at the port side of the poppet is greater than a spring side force at the spring side of the poppet then the poppet is pushed by the port side force into the open position, and when the port side force at the port side of the poppet is not greater than the spring side force at the spring side of the poppet then the poppet is pushed by the spring side force into the closed position.

8. The hydraulic cartridge valve of claim 7, wherein the spring is a coil spring with an interior surrounded by coils of the spring; and
the pushrod is located in the interior of the spring, the proximal end of the pushrod adjacent to the spring side of the poppet.

9. The hydraulic cartridge valve of claim 8, wherein the distal end of the pushrod is moveable in the opening on the interior side of the diaphragm.

10. The hydraulic cartridge valve of claim 9, wherein the activation sensor is a contact sensor; and
wherein when the poppet is in the open position then the distal end of the pushrod is pushed against the diaphragm, and the activation sensor detects contact of the distal end of the pushrod against the diaphragm.

11. The hydraulic cartridge valve of claim 9, wherein the activation sensor is a contactless sensor; and
wherein when the poppet is in the open position then the activation sensor senses proximity of the distal end of the pushrod, and when the poppet is in the closed position then the activation sensor does not sense proximity of the distal end of the pushrod.

12. The hydraulic cartridge valve of claim 11, wherein the activation sensor is a magnetic sensor that senses proximity of the distal end of the pushrod.

13. The hydraulic cartridge valve of claim 1, wherein the housing comprises an upper body and a lower body, where the first port is located in the lower body.

14. The hydraulic cartridge valve of claim 13,
wherein the opening passes through the upper body of the housing into the housing interior; and
wherein the activation sensor is on the exterior side of the diaphragm.

15. The hydraulic cartridge valve of claim 14, further comprising a spring located in the housing interior, where the spring has an interior surrounded by coils of the spring and the pushrod is located in the interior of the spring, and where the spring has a spring force configured to push against a spring side of the poppet to push the poppet into the first port to block flow through the first port; and wherein the poppet also includes a port side that faces the first port, where the port side of the poppet is opposite the spring side of the poppet; and wherein when a port side force at the port side of the poppet is greater than a spring side force at the spring side of the poppet then the poppet is pushed by the port side force into the open position, and when the port side force at the port side of the poppet is not greater than the spring side force at the spring side of the poppet then the poppet is pushed by the spring side force into the closed position.

16. The hydraulic cartridge valve of claim 15, wherein the distal end of the pushrod is moveable in the opening on the interior side of the diaphragm.

17. The hydraulic cartridge valve of claim 16, wherein the activation sensor is a contact sensor; and
wherein when the poppet is in the open position then the distal end of the pushrod is pushed against the diaphragm, and the activation sensor detects contact of the distal end of the pushrod against the diaphragm.

18. The hydraulic cartridge valve of claim 16, wherein the activation sensor is a contactless sensor; and
wherein when the poppet is in the open position then the activation sensor senses proximity of the distal end of the pushrod, and when the poppet is in the closed position then the activation sensor does not sense proximity of the distal end of the pushrod.

* * * * *